(12) United States Patent
Ferguson

(10) Patent No.: US 11,037,444 B2
(45) Date of Patent: *Jun. 15, 2021

(54) DESIGNING PREFERRED VEHICLE ROUTES BASED ON DRIVING SCORES FROM OTHER VEHICLES

(71) Applicant: Allstate Insurance Company, Northbrook, IL (US)

(72) Inventor: Dana Ferguson, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 68 days.

This patent is subject to a terminal disclaimer.

(21) Appl. No.: 16/448,565

(22) Filed: Jun. 21, 2019

(65) Prior Publication Data

US 2019/0362629 A1  Nov. 28, 2019

Related U.S. Application Data

(63) Continuation of application No. 15/614,176, filed on Jun. 5, 2017, now Pat. No. 10,332,397, which is a
(Continued)

(51) Int. Cl.
*G08G 1/09* (2006.01)
*G01C 21/34* (2006.01)
(Continued)

(52) U.S. Cl.
CPC ....... *G08G 1/096838* (2013.01); *B60W 40/09* (2013.01); *G01C 21/34* (2013.01);
(Continued)

(58) Field of Classification Search
CPC ... B60W 40/09; G01C 21/34; G01C 21/3453; G01C 21/3484; G06Q 10/00;
(Continued)

(56) References Cited

U.S. PATENT DOCUMENTS 6,098,048 A   8/2000 Dashefsky et al.
6,175,803 B1  1/2001 Chowanic et al.
(Continued)

FOREIGN PATENT DOCUMENTS

EP   2312552 A2      4/2011
WO   2013074983 A1   5/2013
(Continued)

OTHER PUBLICATIONS

Dec. 9, 2016—U.S. Non-Final Office Action—U.S. Appl. No. 15/013,733.
(Continued)

*Primary Examiner* — Tyler J Lee

(74) *Attorney, Agent, or Firm* — Banner & Witcoff, Ltd.

(57) ABSTRACT

Systems and methods are provided for designing a preferred route for a vehicle. The route designing system receives a request from the vehicle for a preferred route from a first geographical point to a second geographical point. The route designing system analyzes the request and obtains driving scores associated with drivers of other vehicles. The route designing unit may identify a set of preferred and non-preferred vehicles based on the driving scores. The route designing system then determines a preferred route based, at least in part, on the driving scores associated with drivers of the other vehicles. The preferred route is designed to minimize the likelihood of proximity to non-preferred vehicles and maximize the likelihood of proximity to preferred vehicles.

20 Claims, 6 Drawing Sheets

Related U.S. Application Data continuation of application No. 15/013,733, filed on Feb. 2, 2016, now Pat. No. 9,672,738.

(51) Int. Cl.
   | | |
   |---|---|
   | *G08G 1/01* | (2006.01) |
   | *B60W 40/09* | (2012.01) |
   | *G08G 1/0968* | (2006.01) |
   | *G07C 5/00* | (2006.01) |
   | *G06Q 10/00* | (2012.01) |

(52) U.S. Cl.
   CPC ..... *G01C 21/3453* (2013.01); *G01C 21/3484* (2013.01); *G06Q 10/00* (2013.01); *G07C 5/008* (2013.01); *G08G 1/012* (2013.01); *G08G 1/0112* (2013.01); *G08G 1/0125* (2013.01); *G08G 1/0129* (2013.01); *G08G 1/0141* (2013.01); *G08G 1/096811* (2013.01); *G08G 1/096816* (2013.01); *G08G 1/096844* (2013.01)

(58) Field of Classification Search
   CPC ...... G07C 5/008; G08G 1/0112; G08G 1/012; G08G 1/0125; G08G 1/0129; G08G 1/0141; G08G 1/096811; G08G 1/096816; G08G 1/096838; G08G 1/096844
   See application file for complete search history.

(56) References Cited

U.S. PATENT DOCUMENTS

| | | | |
|---|---|---|---|
| 7,421,334 | B2 | 9/2008 | Dahlgren et al. |
| 7,805,240 | B2 | 9/2010 | Naitou et al. |
| 7,840,427 | B2 | 11/2010 | O'Sullivan |
| 8,321,125 | B2 | 11/2012 | Tengler et al. |
| 8,718,925 | B2 | 5/2014 | Letchner et al. |
| 8,738,285 | B2 | 5/2014 | Scofield et al. |
| 8,918,284 | B2 | 12/2014 | Tokashiki |
| 9,104,535 | B1 | 8/2015 | Brinkmann et al. |
| 9,506,770 | B2 | 11/2016 | Ding et al. |
| 2005/0125148 | A1 | 6/2005 | Van Buer et al. |
| 2005/0222764 | A1 | 10/2005 | Uyeki et al. |
| 2010/0036599 | A1* | 2/2010 | Froeberg ............ G01C 21/3461 701/532 |
| 2010/0238009 | A1 | 9/2010 | Cook et al. |
| 2010/0256903 | A1 | 10/2010 | Johnson |
| 2011/0012720 | A1 | 1/2011 | Hirschfeld |
| 2011/0112717 | A1 | 5/2011 | Resner |
| 2013/0080055 | A1 | 3/2013 | Speier et al. |
| 2013/0144657 | A1 | 6/2013 | Ricci |
| 2014/0019522 | A1* | 1/2014 | Weng .................... G06F 16/903 709/203 |
| 2014/0067434 | A1 | 3/2014 | Bourne et al. |
| 2014/0180727 | A1 | 6/2014 | Freiberger et al. |
| 2014/0229107 | A1 | 8/2014 | Didjusto et al. |
| 2015/0019115 | A1 | 1/2015 | Kim |
| 2015/0308845 | A1 | 10/2015 | Ding et al. |

FOREIGN PATENT DOCUMENTS

| | | |
|---|---|---|
| WO | 2014059208 A2 | 4/2014 |
| WO | 2015134339 A1 | 9/2015 |

OTHER PUBLICATIONS

Mar. 2, 2017—(PCT)—International Search Report—App. PCT/US17/15949.

Mar. 2, 2017—(PCT) Written Opinion—App. PCT/US17/15949.

Mar. 20, 2017—U.S. Notice of Allowance—U.S. Appl. No. 15/013,733.

Sep. 4, 2018—U.S. Non-Final Office Action—U.S. Appl. No. 15/614,176.

BMW Technology Guide—Telematics, retrieved from Internet Feb. 2, 2016, URL http://www.bmw.com/com/en/insights/technology/technology_guide?articles/telematics.html.

City Transport Monitoring and Routes Optimal Management System—Taylor Francis Online, retrieved from Internet Feb. 2, 2016, URL: http://www.tandfonline.com/doi/abs/10.3846/1648-4142.2008.23.144-149#.VQISOdKUc8s.

Fleetistics—Driver Risk and Safety Management, retrieved from Internet Feb. 2, 2016, URL http://www.fleetistics.com/features/go/driver-risk.php.

Telematics—Related Safety Technologies, Honda's Approaches to ITS, retrieved from Internet Feb. 2, 2016, URL: http://www.nxp.com/events/communicating-cars/images/Honda_ITS_Activities.pdf.

May 16, 2019—Office Action—Application No. 3,013,057.

Sep. 27, 2019—(EP) Extended Search Report—Application No. 17748043.1.

Jun. 29, 2010—(CA) Office Action—App. No. 3,013,057.

\* cited by examiner

DESIGNING PREFERRED VEHICLE ROUTES BASED ON DRIVING SCORES FROM OTHER VEHICLES

CROSS REFERENCE TO RELATED APPLICATIONS

This application is a continuation of U.S. patent application Ser. No. 15/614,176 filed Jun. 5, 2017, which is a continuation of U.S. patent application Ser. No. 15/013,733 entitled "Designing Preferred Vehicle Routes Based on Driving Scores From Other Vehicles," filed Feb. 2, 2016 (now U.S. Pat. No. 9,672,738), the contents of all of the above are hereby incorporated by reference in their entireties.

BACKGROUND

Insurance companies value the safety of drivers and the general public. Accordingly, preventing clusters of bad driving behaviors is a matter of good policy. Although techniques exist to generally encourage safe driving, they might not provide a mechanism whereby drivers may avoid proximity to bad drivers while traveling from one geographical point to another. Further, these techniques might not allow good drivers to maintain proximity to each other.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

A first aspect described herein provides a route designing system. The route designing system may include at least one processor. The route designing system may be configured to, in operation, receive a request for a preferred route from a first geographical point to a second geographical point for a first vehicle. Based on the request, the route designing system may identify a plurality of potential routes from the first geographical point to the second geographical point for the first vehicle. The route designing system may then determine driving scores associated with drivers of each of a plurality of vehicles, wherein the plurality of vehicles does not include the first vehicle. Based at least in part on the driving scores, the route designing system may identify a set of preferred vehicles and a set of non-preferred vehicles within the plurality of vehicles. Further, the route designing system may associate vehicles in the set of preferred vehicles and vehicles the set of non-preferred vehicles with the plurality of potential routes. The route designing system may determine a preferred route for the first vehicle from the plurality of potential routes, such that the preferred route maximizes a likelihood of proximity to the first portion of the set of preferred vehicles and minimizes the likelihood of proximity to the second portion of the set of non-preferred vehicles.

A second aspect described herein provides a computer-assisted method of designing a preferred route. A computing system may receive a request for a preferred route from a first geographical point to a second geographical point for a first vehicle. Based on the request, the computing system may identify a plurality of potential routes from the first geographical point to the second geographical point for the first vehicle. The computing system may then determine driving scores associated with drivers of each of a plurality of vehicles, wherein the plurality of vehicles does not include the first vehicle. Based at least in part on the driving scores, the computing system may identify a set of preferred vehicles and a set of non-preferred vehicles within the plurality of vehicles. Further, the computing system may associate vehicles in the set of preferred vehicles and vehicles in the set of non-preferred vehicles with the plurality of potential routes. The computing system may then determine a preferred route for the first vehicle from the plurality of potential routes, such that the preferred route maximizes a likelihood of proximity to the first portion of the set of preferred vehicles and minimizes the likelihood of proximity to the second portion of the set of non-preferred vehicles.

The details of these and other aspects of the disclosure are set forth in the accompanying drawings and description below. Other features and advantages of the disclosure will be apparent from the description and drawings.

BRIEF DESCRIPTION OF THE DRAWINGS

Aspects of the disclosure may be implemented in certain parts, steps, and embodiments that will be described in detail in the following description and illustrated in the accompanying drawings in which like reference materials indicate similar elements. It will be appreciated with the benefit of this disclosure that the steps illustrated in the accompanying figures may be performed in other than the recited order and that one or more of the steps may be optional. It will also be appreciated with the benefit of this disclosure that one or more components illustrated in the accompanying figures may be positioned in other than the disclosed arrangement and that one or more of the components illustrated may be optional.

DETAILED DESCRIPTION

Aspects of the present disclosure are directed toward a route designing system. The route designing system receives requests for preferred routes for a vehicle (e.g., a requesting vehicle, a primary vehicle, etc.) from a first geographical point to a second geographical point, receives driving scores associated with drivers of other vehicles, identifies preferred and non-preferred vehicles based on the driving scores, and designs preferred routes in which the vehicle maintains a threshold non-preferred distance from at least a portion of the non-preferred vehicles. The route designing system allows the vehicle to continue maintain a threshold non-preferred distance from at least a portion of the non-preferred vehicles for the duration of a trip by receiving updated driving scores from other vehicles and accordingly updating the preferred routes. In determining preferred routes, the route designing system may be subject to traffic rules and other regulations. Additionally, the route designing system may provide alerts to the driver of the vehicle regarding the preferred routes and/or non-preferred vehicles. The driver of the vehicle may be a customer of an insurance provider (e.g., an insurance provider implementing the system) or a customer of another, different insurance provider.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof, as well as additional items and equivalents thereof. As used in this description, a set refers to a collection of one or more elements. Further, as used in this description, a set may refer to the whole or a number less than the whole. For example, a set of vehicles may include all vehicles or a portion of all vehicles. As used in this description, a driver refers to any individual operating a vehicle. The individual may or may not hold an insurance policy (e.g., with an insurance provider implementing the system). As such, the individual may be a customer of an insurance provider implementing the system, or a customer of another, different insurance provider.

Figure 1:
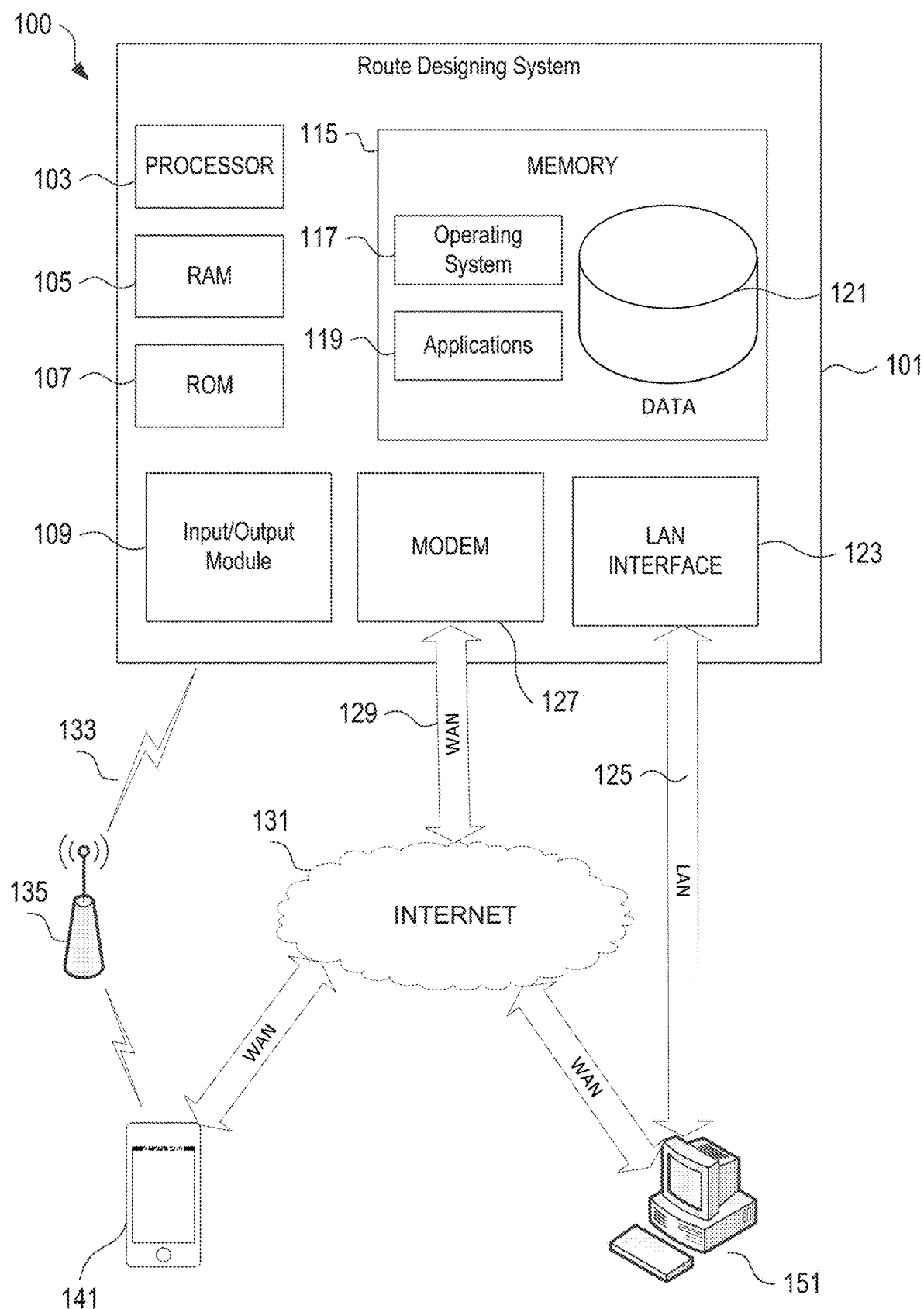
FIG. 1 illustrates a network environment in which a route designing system may be implemented.

FIG. 1 illustrates a block diagram of a route designing system 101 in a vehicle guidance system 100 that may be used according to one or more illustrative embodiments of a disclosure. The route designing system 101 may have a processor 103 for controlling the overall operation of the route designing system 101 and its associated components, including RAM 105, ROM 107, input/output unit 109, and memory 115. The route designing system 101, along with one or more additional devices (e.g., terminals 141, 151) may correspond to one or more special-purpose computing devices, such as route planning computing devices or systems, configured as described herein for receiving requests for preferred routes for a vehicle from a first geographical point to a second geographical point, receiving driving scores associated with drivers of other vehicles, identifying preferred and non-preferred vehicles based on the driving scores, and designing preferred routes in which the vehicle maintains a threshold non-preferred distance from at least some of the non-preferred vehicles. Driving scores may be received from one or more telematics devices, vehicle sensors, vehicle subsystems, or remote systems (e.g., insurance system), and then transmitted to a system or device located remotely relative to the vehicle. Additionally or alternatively, in some examples, the system or device receiving the driving score may be located within the vehicle. Driving scores may also be received from a mobile computing device or third-party telematics system.

Input/Output (I/O) devices 109 may include a microphone, keypad, touch screen, and/or stylus through which a user of a route designing system 101 may provide input, and may also include one or more of a speaker for providing audio output and a video display device for providing textual, audiovisual, and/or graphical output. Software may be stored within memory 115 and/or storage to provide instructions to processor 103 for enabling the route designing system 101 to perform various functions. For example, memory 115 may store software used by the route designing system 101, such as an operating system 117, application programs 119, and an associated internal database 121. Processor 103 and its associated special-purpose computing devices may allow the vehicle guidance system 100 to execute a series of computer-readable instructions for receiving requests for preferred routes for a vehicle, receiving driving scores associated with drivers of other vehicles, identifying preferred and non-preferred vehicles based on the driving scores, and designing preferred routes in which the vehicle maintains a threshold distance from at least a portion of the non-preferred vehicles.

The route designing system 101 may operate in a networked environment 100 supporting connections to one or more remote computers, such as terminals/devices 141 and 151. The route designing system 101, and related terminals/devices 141 and 151, may be in signal communication with special-purpose devices installed in vehicles, special-purpose mobile computer devices that may travel within vehicles, or special-purpose devices outside of vehicles that are configured to process telematics data and calculate driving scores. Thus, terminates/devices 141 and 161 may each include personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, wearable devices, and the like), and may include some or all of the elements described above with respect to the route designing system 101.

The network connections depicted in FIG. 1 include a local area network (LAN) 125 and a wide area network (WAN) 129, a wireless telecommunications network 133, but may also include other networks. When used in a LAN networking environment, the route designing system 101 may be connected to the LAN 125 through a network interface or adapter 123. When used in a WAN networking environment, the route designing system 101 may include a modem 127 or other means for establishing communications over the WAN 129, such as a network 131 (e.g., the Internet). When used in a wireless telecommunications network 133, the route designing system 101 may include one or more transceivers, digital signal processors, and additional circuitry and software for communicating with wireless computing device 141 (e.g., mobile phones, short-range vehicle communication systems, vehicle telematics devices, wearable devices, etc.) via one or more network devices 135 (e.g., base transceiver stations) in the wireless network 133.

It will be appreciated that the network connections shown are illustrative and other means of establishing a communications link between computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices described herein may be configured to communicate using any of these network protocols and technologies.

Additionally, one or more application programs 119 used by the route designing system 101 may include computer executable instructions (e.g., instructions for route request programs, driving score collection and analysis programs, and route designing programs) for receiving requests for preferred routes for a vehicle, receiving driving scores associated with drivers of other vehicles, identifying preferred and non-preferred vehicles based on the driving scores, and designing preferred routes in which the vehicle maintains a threshold distance from at least a portion of the non-preferred vehicles.

Figure 2:
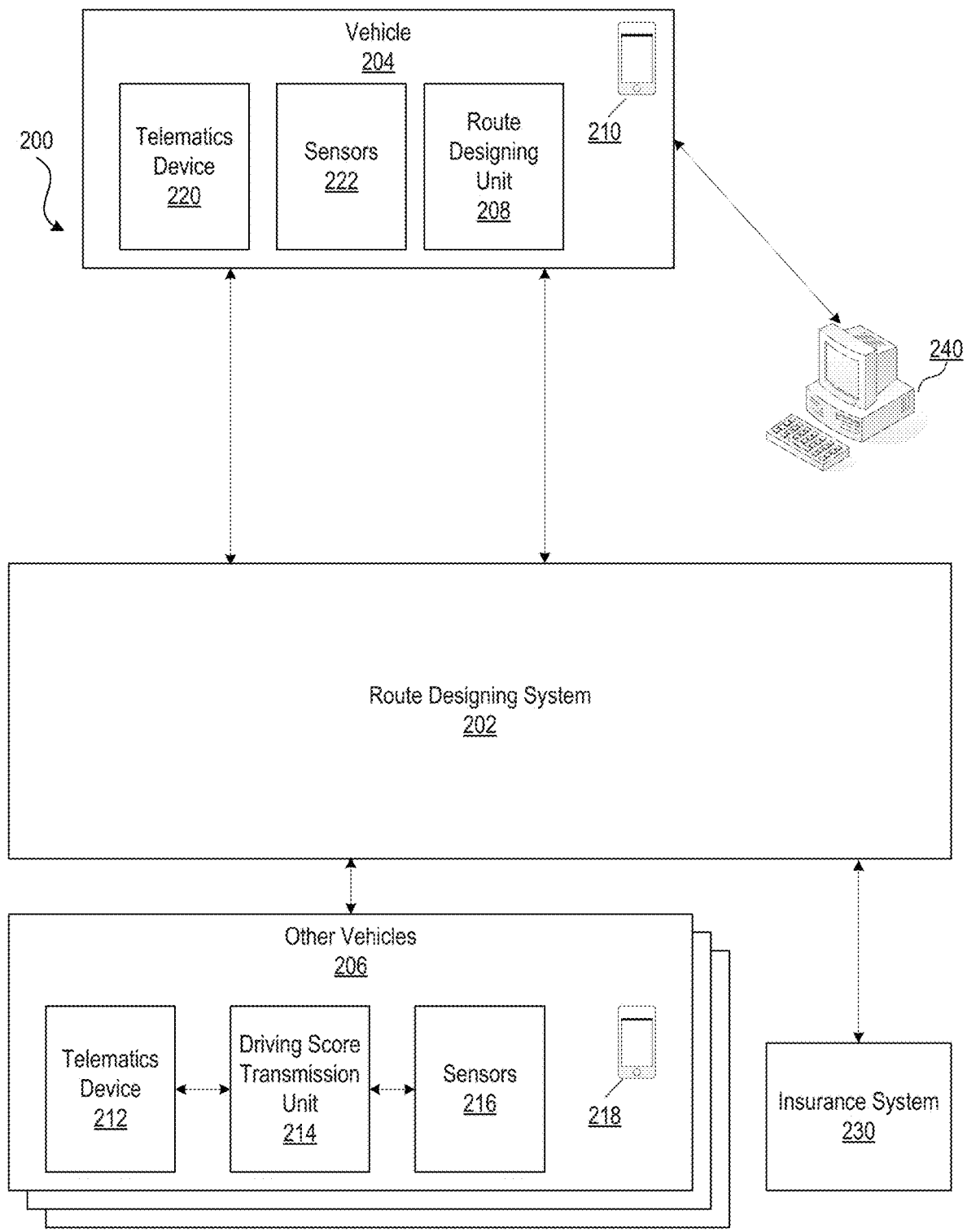
FIG. 2 illustrates a block diagram illustrating various components and devices associated with an example route designing system, according to one or more aspects of the disclosure.

FIG. 2 is an illustration of an example implementation of a routing system 200. The system 200, in this example, includes a route designing system 202. The route designing system 202, described in further detail below, determines a preferred route from a first geographical point to a second geographical point for a vehicle. The route designing system 202 determines the preferred route based on driving scores associated with drivers of other vehicles along a plurality of identified potential routes. The driving scores associated with drivers of other vehicles may be based on vehicle telematics data associated with each of the other vehicles. Vehicle telematics data, as used in this description, refers to how a driver operates a vehicle with respect to, e.g., accelerating, decelerating, braking, turning, signaling, lane usage, adequate vehicle spacing, speed, distraction management, and other driving-related operations performed by the driver at the vehicle. A vehicle telematics device may be installed at, attached to, or in signal communication with a vehicle or various systems or components of the vehicle. Such a vehicle telematics device may be used to collect and transmit vehicle telematics data. For instance, the vehicle telematics device 212 may be in communication with one or more sensors 216 within vehicle 206. In some examples, the vehicle 204 may also be equipped with a vehicle telematics device 220, where the vehicle telematics device 220 may be in communication with one or more sensors 222 within vehicle 204. Various types of sensors and systems monitored will be discussed more fully below.

The route designing system 202 may contain some or all of the hardware/software components as the route designing system 101 depicted in FIG. 1. The route designing system 202 is a special-purpose computing device that is configured to receive and process requests for a preferred route from a first geographical point to a second geographical point from a vehicle 204. The route designing system 202 may communicate with a vehicle 204 (e.g., to receive requests for a preferred route, provide a preferred route, provide notifications, provide alerts, etc.) wirelessly via a special-purpose mobile computing device 210 or through a route designing unit 208 which may be (i) installed and attached to the vehicle 204, (ii) located in the vehicle 204 during the vehicle's operation, or (iii) located remotely relative to the vehicle 204.

The route designing system 202 is also configured to receive driving scores from one or more vehicles 206, such that information may be received (i) from telematics devices installed and attached to the vehicle 206, (ii) from telematics devices located in the vehicle 206 during the vehicle's operation (e.g., at a mobile special-purpose computing device), or (iii) from a special-purpose computing device located remotely relative to the vehicle 206 that received the vehicle telematics data from telematics devices installed in, attached to, or located in the vehicle 206 as described in (i) or (ii). The route designing system 202 may also be configured to receive driving scores or telematics data associated with vehicles 206 from one or more third-party telematics systems. Additionally, the route designing system 202 may receive additional data relevant to determining a preferred route from other non-vehicle data sources, such as an external traffic database containing traffic data (e.g., amounts or volume of traffic, average driving speed, traffic speed distribution, and frequency and types of accidents, etc.) at various times and locations, external weather database containing weather data (e.g., rain snow, sleet and hail amounts, temperatures, wind, road conditions, visibility, etc.) at various times and locations, and other external data sources containing driving hazard data (e.g., road hazards, traffic accidents, downed trees, power outages, construction zones, school zones, and natural disasters, etc.). As such, the route designing system 202 may be further configured to send and receive data to and from a third-party system 230 (e.g., traffic databases, weather databases, insurance systems, etc.) and other systems associated with vehicle operation and driving conditions.

In some examples, the route designing system 202 may acquire a driving score associated with a driver of a vehicle 206 directly from the vehicle 206, where the driving score may be calculated at or by the vehicle 206 itself. The vehicle 206 may be, for example, an automobile, motorcycle, scooter, bus, recreational vehicle, boat, bicycle, or other vehicle for which vehicle telematics data may be collected and analyzed, and for which an associated driver may be provided a driving score based on the vehicle telematics data. The vehicle 206 may include one or more sensors 216, which are capable of detecting or recording various conditions at the vehicle and operating parameters of the vehicle 206. For example, the sensors 216 may detect, transmit, or store data corresponding to the vehicle's location (e.g., GPS coordinates), speed and direction, rates of acceleration, deceleration, braking, and specific instances of sudden acceleration, braking, and swerving. The sensors 216 may also detect, transmit, and store data received from the vehicle's internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems.

Additional sensors 216 may detect and store external driving conditions, for example, external temperature, rain, snow, light levels, and sun position for driver visibility. Additional sensors 216 may also detect and store data relating to compliance with traffic laws and the observance of traffic signals and signs. Additional sensors 216 may further detect and store data relating to the maintenance of the vehicle 204, such as the engine status, oil level, engine coolant temperature, odometer reading, the level of fuel in the fuel tank, engine revolutions per minute (RPMs), tire pressure, or combinations thereof.

The vehicle 206 may also include cameras or proximity sensors 216 capable of recording additional conditions inside or outside of the vehicle 206. For example, internal cameras may detect conditions such as the number of passengers and the types of passengers (e.g., adults, children, teenagers, handicapped, etc.) in the vehicles, and potential sources of driver distraction within the vehicle (e.g., pets, phone usage, unsecured objects in the vehicle). Sensors 216 may also be configured to collect a driver's movements or the condition of a driver. For example, the vehicle 206 may include sensors 216 that monitor a driver's movements, such as the driver's eye position and/or head position, etc. Additional sensors 216 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer. Further, the vehicle 206 may include sensors 216 that are capable of detecting other nearby vehicles, traffic levels, road conditions, traffic obstructions, animals, cyclists, pedestrians, and other conditions that may factor into an analysis of vehicle telematics data. Certain vehicle sensors 216 may also collect information regarding the driver's route choice, whether the driver follows a given route, and to classify the type of trip (e.g., commute, errand, new route, etc.). A Global Positioning System (GPS), locational sensors positioned inside the vehicle 206, and/or locational sensors or devices external to the vehicle 206 may be used to determine the route, trip type, lane position, and other vehicle position or location data.

The data collected by the vehicle sensors 216 may be stored or analyzed within the respective vehicle 206, or may be transmitted to one or more external devices. For example, as shown in FIG. 2, sensor data may be transmitted to the driving score transmission unit 214, which may be a collection of special-purpose computing devices that are interconnected and in signal communication with each other. The special-purpose computing devices may be programmed with a particular set of instructions that, when executed, perform functions associated with using vehicle telematics data to calculate and transmit a driving score for a driver associated with the vehicle 206. The driving score transmission unit 214 may be a separate special-purpose computing device or may be integrated into one or more components within the vehicle 206, such as the telematics device 212, or in the internal computing systems of the vehicle 206. In other embodiments, the driving score transmission unit 214 may be remotely located relative to the vehicle 206. As such, the driving score calculated by the driving score transmission unit 214 may be transmitted by the driving score transmission unit 214 to one or more remote computing systems, such as the route designing system 202. A telematics device 212 may be a computing device containing many or all of the hardware/software components as the route designing system 101 depicted in FIG. 1. As discussed above, the telematics device 212 may receive vehicle telematics data from vehicle sensors 216, and may transmit the data to one or more external computer systems (e.g., route designing system 202, insurance system 230, etc.) over a wireless transmission network. Telematics devices 212 may also be configured to detect or determine additional types of data relating to real-time driving and the condition of the vehicle 206. In certain embodiments, the telematics device 212 may contain or may be integral with one or more of the vehicle sensors 216. The telematics devices 212 may also store vehicle information associated with the respective vehicle 206, for example, the make, model, trim (or sub-model), year, and/or engine specifications, vehicle identification number (VIN) as well as other information such as vehicle owner or driver information, insurance information, and financing information for the vehicle 106. In some embodiments, the telematics devices 212 may store an indicator as to whether the vehicle 206 is an autonomous vehicle, and if so, the manufacturer of the vehicle 206 and/or the autonomous assist technology installed in the vehicle 206.

In the example shown in FIG. 2, the telematics device 212 may receive vehicle telematics data from vehicle sensors 216, and may transmit the data to a driving score transmission unit 214. However, in other examples, one or more of the vehicle sensors 216 may be configured to transmit data directly to the driving score transmission unit 214 without using a telematics device 212. For instance, a telematics device 212 may be configured to receive and transmit data from certain vehicle sensors 216, while other sensors may be configured to directly transmit data to a driving score transmission unit 214 without using the telematics device 212. Thus, telematics devices 212 may be optional in certain embodiments.

In certain embodiments, a mobile special-purpose computing device 218 within the vehicle 206 may be programmed with instructions to collect vehicle telematics data from the telematics device 212 or from the vehicle sensors 216, and then to transmit the telematics data to the driving score transmission unit 214 and other external computing devices. The mobile special-purpose computing device 218 may include an accelerometer, a GPS unit, and a telecommunication unit. Software applications executing on the mobile special-purpose computing devices 218 may be configured to detect vehicle telematics independently and/or may communicate with the vehicle sensors 216 to receive additional vehicle telematics data. For example, the mobile special-purpose computing device 218, equipped with an accelerometer and/or a GPS unit, may determine vehicle location, speed, direction, and other basic vehicle telematics data without communicating with the vehicle sensors 216, or any vehicle system. In other examples, software on the mobile special-purpose computing device 218 may be configured to receive some or all of the vehicle telematics data collected by vehicle sensors 216. In yet other examples, software on the mobile special-purpose computing device 218 may be configured to receive some or all of the vehicle telematics data from third-party telematics systems.

When the mobile special-purpose computing device 218 within the vehicle 206 is used to detect vehicle telematics data or to receive vehicle telematics data from the vehicle 206, the mobile special-purpose computing device 218 may store, analyze, or transmit the vehicle telematics data to one or more other devices. For example, the mobile special-purpose computing device 218 may transmit vehicle telematics data directly to a driving score transmission unit 214, and thus may be used in conjunction with or instead of the telematics device 212. Moreover, the processing components of the mobile special-purpose computing device 218 may be used to collect and analyze telematics data to calculate a driving score for a driver associated with the vehicle 206. Therefore, in certain embodiments, the mobile special-purpose computing device 212 may be used in conjunction with, or in place of, the driving score transmission unit 214.

The vehicle 206 may include a driving score transmission unit 214, which may be a separate computing device or may be integrated into one or more other components within the vehicle 206, such as the telematics device 212, the internal computing systems of the vehicle 206, or the mobile special-purpose computing device 218. As discussed above, the driving score transmission unit 214 may also be implemented by computing devices independent from the vehicle 206, such as one or more computer systems 240. In any of these examples, the driving score transmission unit 214 may contain some or all of the hardware/software as the route designing system 101 depicted in FIG. 1.

In some embodiments, at least some of the functionality of the driving score transmission unit 214, such as collecting and analyzing vehicle telematics data and calculating a driving score, may be performed by an external system rather than by the individual vehicle 206. In such implementations, the vehicle 206 may collect and transmit vehicle telematics data and transmit the vehicle operation data directly to an external system, such as the route designing system 202 or another special-purpose computer device configured to calculate a driving score based on vehicle telematics data. In such examples, the driving score transmission unit 214 may be optional.

The driving score transmission unit 214 may be implemented in hardware and/or software configured to receive vehicle telematics data from the vehicle sensors 216, the telematics device 212, and/or other vehicle telematics data sources. After receiving the vehicle data, the driving score transmission unit 214 may perform functions to collect and analyze the vehicle telematics data, and calculate a driving score based on the vehicle telematics data. Further description and examples of the functions performed by the driving score transmission unit 214 are described below.

In some examples, the driving score transmission unit 214 may communicate a driver's driving score to an insurance system 230. The driving score transmission unit 214 may be in signal communication with the insurance system 230 via a network such as those described above.

Figure 3:
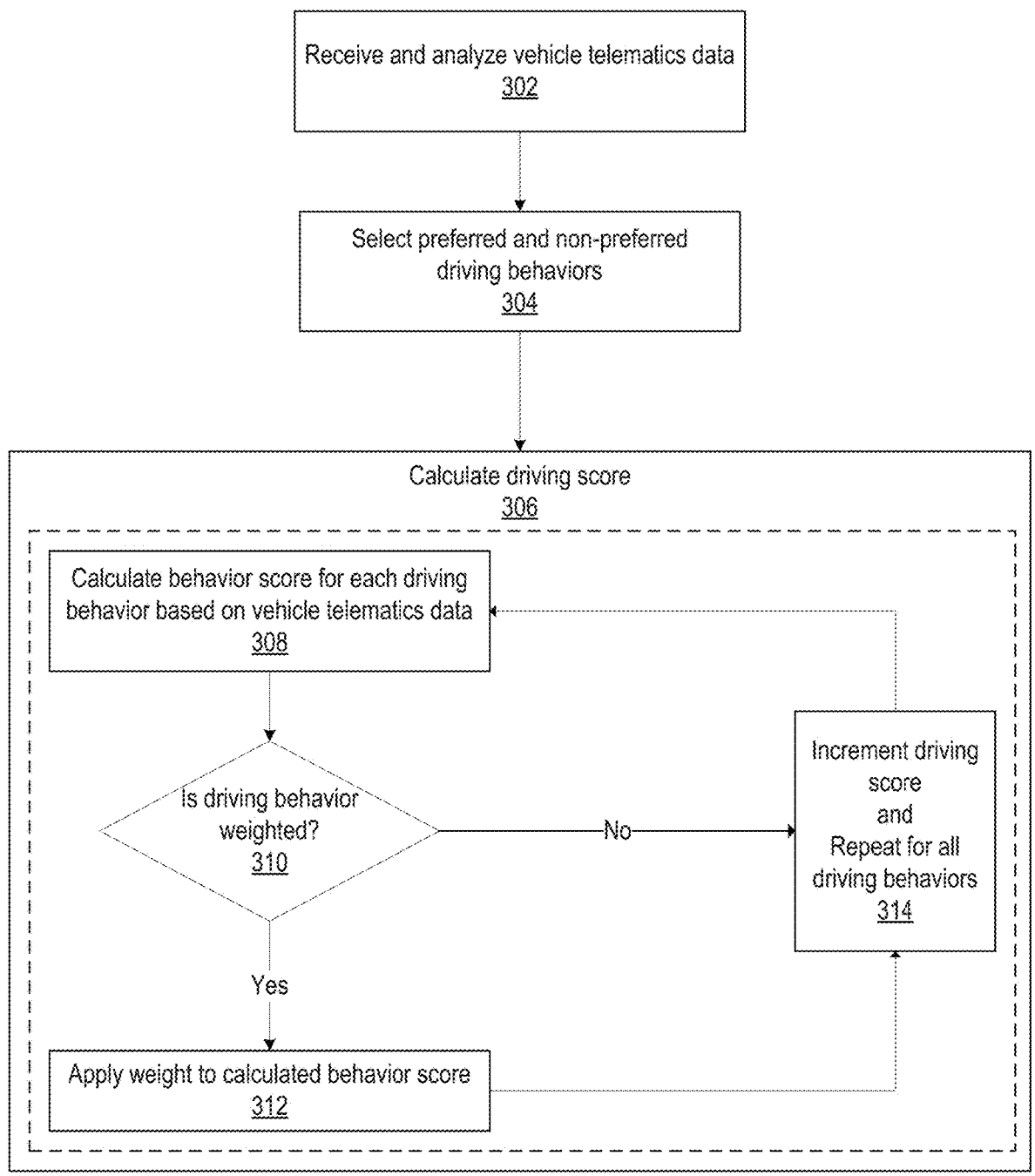
FIG. 3 is a flowchart of example method steps for collecting and analyzing telematics data, and calculating a driving score based on the telematics data.

FIG. 3 is a flowchart of example method steps for collecting and analyzing telematics data, and calculating a driving score based on the telematics data. As described above, these example steps may be performed by the driving score transmission unit 214 or by the route designing system 202. As such, various components of the driving score transmission unit 214 and/or the route designing system 202 may be used to perform these method steps.

In at least one embodiment, the driving score transmission unit 214 may receive and analyze vehicle telematics data (block 302) from the vehicle 206 (e.g., by a telematics device 212 installed at or attached to the vehicle, and/or by one or more sensors 216 installed at, attached to, and/or remotely located relative to the vehicle), from a mobile special-purpose computing device 218 (e.g., a mobile application installed on the mobile special-purpose computing device 218), or a combination thereof. The driving score transmission unit 214 may analyze the vehicle telematics data to identify one or more driving events, one or more driving behaviors, and/or one or more driving conditions as described above. In some examples, the driving score transmission unit 214 may receive vehicle telematics data from the various sources in real-time, or may receive a compiled version of the vehicle telematics data from a central location. In examples where the driving score transmission unit 214 receives the vehicle telematics data in real-time, the driving score transmission unit 214 may associate the vehicle telematics data received from the various sources with a single trip. As such, the various sources of the vehicle telematics data, or the driving score transmission unit 214, may assign a unique trip identifier to the vehicle telematics data, such that the driving score transmission unit 214 associates all vehicle telematics data assigned to a particular unique trip identifier with a single trip. In examples where the driving score transmission unit 214 receives a compiled version of the vehicle telematics data, the driving score transmission unit 214 may receive all telematics data associated with a particular trip, where the trip may be designated by a unique trip identifier.

In some examples, the driving score transmission unit 214 may determine a set of preferred and non-preferred driving behaviors upon which to base the driving score (block 304). The set of preferred driving behaviors may represent driving behaviors for which the driving score transmission unit 214 may reward a driver by increasing the driving score. The set of non-preferred driving behaviors may represent driving behaviors for which the driving score transmission unit 214 may penalize a driver by decreasing the driving score. As such, a driving behavior may be associated with a numeric value. In some examples, the numerical value associated with preferred driving behaviors may be positive, while the numerical value associated with non-preferred driving behaviors may be negative. The set of preferred and non-preferred driving behaviors may be stored in a database communicatively coupled with the driving score transmission unit 214. Additionally or alternatively, the set of preferred driving behaviors and the set of preferred and non-preferred driving behaviors may be stored at an insurance system 230. In such examples, the driving score transmission unit 214 may retrieve some or all of the set of preferred and non-preferred driving behaviors from an insurance system 230 corresponding to an insurance company of a policy held by the driver of the vehicle 206. The set of preferred and non-preferred driving behaviors retrieved from an insurance system 230 may be used in place of or in conjunction with the set of preferred and non-preferred driving behaviors retrieved from a database communicatively coupled with the driving score transmission unit 214.

Preferred and non-preferred driving behaviors may be defined as one or more driving events. A driving event may be based on the speed, acceleration, braking, turning, distance to other vehicles, seat belt usage, turn signal usage, and other vehicle telematics data collected from the vehicle 206. Thus, it will be appreciated that a variety of different preferred and non-preferred driving behaviors may be defined based on a variety of driving events. Further, preferred and non-preferred driving behaviors may be defined in terms of distance travelled (e.g., one hundred miles) and/or time elapsed (e.g., one hour) during a trip (e.g., a period of time starting when the vehicle turned on and ending when the vehicle is turned off or inactive). For example, a preferred driving behavior based in part on speed may be a trip including 1 hour of highway driving within 5 mph of the prescribed time limit. Conversely, a non-preferred driving behavior based in part on speed may be a trip including 15 minutes of highway driving at 15 mph above the prescribed speed limit or average speed of other vehicles within a 1 mile radius. An example preferred driving behavior based in part on braking or deceleration may be a trip including 30 minutes of city driving without occurrences of hard braking (e.g., deceleration of 7 mph/s or greater, etc.). An example preferred driving behavior based in part on acceleration may be a trip including 30 minutes of highway driving without occurrences of fast acceleration (e.g., acceleration of 10 mph/s or greater, etc.). Conversely, an example non-preferred driving behavior based in part on acceleration may be a trip including 30 minutes of highway driving with multiple occurrences of sudden acceleration and lane changes (i.e., weaving through traffic). An example preferred driving behavior based in part on turning may be a trip including 50 miles of driving with only soft turns (e.g., an angle of turn greater than 90°, controlled turns, etc.). Conversely, a non-preferred driving behavior based in part on turning may be a trip including multiple sharp turns, sudden turns (e.g., without a turn signal, etc.) or U-turns. An example preferred driving based in part on turn signal usage may be activating a turn signal at least 100 feet before initiating each turn of a trip. In other examples, preferred and non-preferred driving behaviors may be based in part on particular driving conditions. For instance, a preferred driving behavior may be driving at least 10 mph below the speed limit during periods of the trip including inclement or severe weather (e.g., rain, snow, fog, etc.). It will be appreciated that additional or alternative preferred and non-preferred driving behaviors may be defined and implemented to identify safe and unsafe driving events, respectively, when operating a vehicle.

In some examples, the set of preferred and non-preferred driving behaviors may be associated categories. For instance, a set of preferred and non-preferred driving behaviors may be associated with a particular insurance company. In other examples, a set of preferred and non-preferred driving behaviors may be associated with a vehicle manufacturer. In yet other examples, one set of preferred and non-preferred driving behaviors may be associated with autonomous vehicles, while another set of preferred and non-preferred driving behaviors may be associated with autonomous vehicles. In other instances, a set of preferred and non-preferred driving behaviors may be associated with contextual information (e.g., age of driver, time of day, weather conditions, type of roadway, driver characteristics, etc.). Thus, the set of preferred and non-preferred driving behaviors used to calculate a driving score may vary for drivers and/or vehicles. For example, the set of preferred and non-preferred driving behaviors may differ for vehicle telematics data associated with a daytime trip versus a nighttime trip, a city streets trip versus an expressway trip, a trip during sunny weather versus a trip during rainy/icy conditions, a new driver versus an experienced driver, etc.

In some embodiments, preferred and non-preferred driving behaviors may be assigned a weight, where the weight may be used in calculating a driving score. The weight may represent the importance of a particular preferred or non-preferred driving behavior. As such, a preferred or non-preferred driving behavior with a larger weight will have more influence on the driving score calculation. Additionally or alternatively, a category may be assigned a weight, whereby one or more of the preferred and non-preferred driving behaviors associated with the category may be assigned a weight according to the weight assigned to the category. In examples where a category is assigned a particular weight, all preferred and non-preferred driving behaviors associated with the category are assigned the same weight. In these examples, even where two vehicles exhibit the same preferred and non-preferred driving behaviors, the driving score for these vehicles may be different where the two vehicles belong to different categories having different weights. For instance, an autonomous vehicle exhibiting the same preferred and non-preferred driving behaviors as a non-autonomous vehicle may have a higher driving score than the non-autonomous vehicle. As such, the route designing system 202 may operate, or may be configured to operate, under assumptions that a particular category of vehicles may be safer than others exhibiting the same or similar preferred and non-preferred behaviors. In the example of autonomous vehicles, the category weight may be tied to the safety ratings of the autonomous vehicle manufacturer.

In another example, the weight assigned to the category may be used as a default weight, which may be overridden by a weight assigned specially to a preferred or non-preferred driving behavior.

The calculation of a driving score based on the assigned weight will be described in further detail below.

Based on the determined set of preferred and non-preferred driving behaviors, the driving score transmission unit 214 may calculate a driving score for the driver associated with the vehicle telematics data (block 306). For each preferred driving behavior and each non-preferred driving behavior in the set of preferred and non-preferred driving behaviors, the driving score transmission unit 214 may calculate a behavior score based on the vehicle telematics data (block 308). Specifically, the driving score transmission unit 214 may first determine whether the driving behavior was exhibited in the vehicle telematics data. For example, where the driving behavior is based on maintaining an average speed below 50 mph during a trip, the driving score transmission unit 214 may determine whether the vehicle telematics data for a particular trip reflected an average speed below 50 mph by comparing the average speed of the trip with the 50 mph speed limit. Accordingly, in some examples, the driving score transmission unit 214 may calculate one or more trip metrics based on the vehicle telematics data (e.g., average/minimum/maximum speed, total distance travelled, etc.) in order to make a determination as to whether the driver engaged in a preferred or non-preferred driving behavior.

Where the driving score transmission unit 214 determines that the driver engaged in a driving behavior based on the vehicle telematics data, the driving score transmission unit 214 may use the numerical value associated with the driving behavior as the behavior score for that driving behavior. The driving score transmission unit 214 may adjust the behavior score for that driving behavior based on the weight assigned to the driving behavior (block 310). Where a weight is assigned to a driving behavior, the driving score transmission unit 214 may combine the behavior score for that driving behavior with the weight of the driving behavior (e.g., by multiplying the weight and the numerical value, etc.) (block 312). Additionally or alternatively, the driving score transmission unit 214 may use the weight assigned to the category associated with the driving category to adjust the behavior score for that driving behavior.

The driving score transmission unit 214 may repeat these method steps (blocks 308, 310, and 312) for all the driving behaviors in the set of preferred and non-preferred driving behaviors. As such, the driving score transmission unit 214 may calculate a behavior score for each driving behavior in the set, and combine (e.g., add) all of the behavior scores to obtain a driving score based on the vehicle telematics data. The driving score transmission unit 214 will be configured to combine both positive and negative behavior scores. It will be appreciated that additional or alternative mathematical operations may be performed to aggregate the behavior scores for each driving behavior to obtain a driving score.

Figure 4:
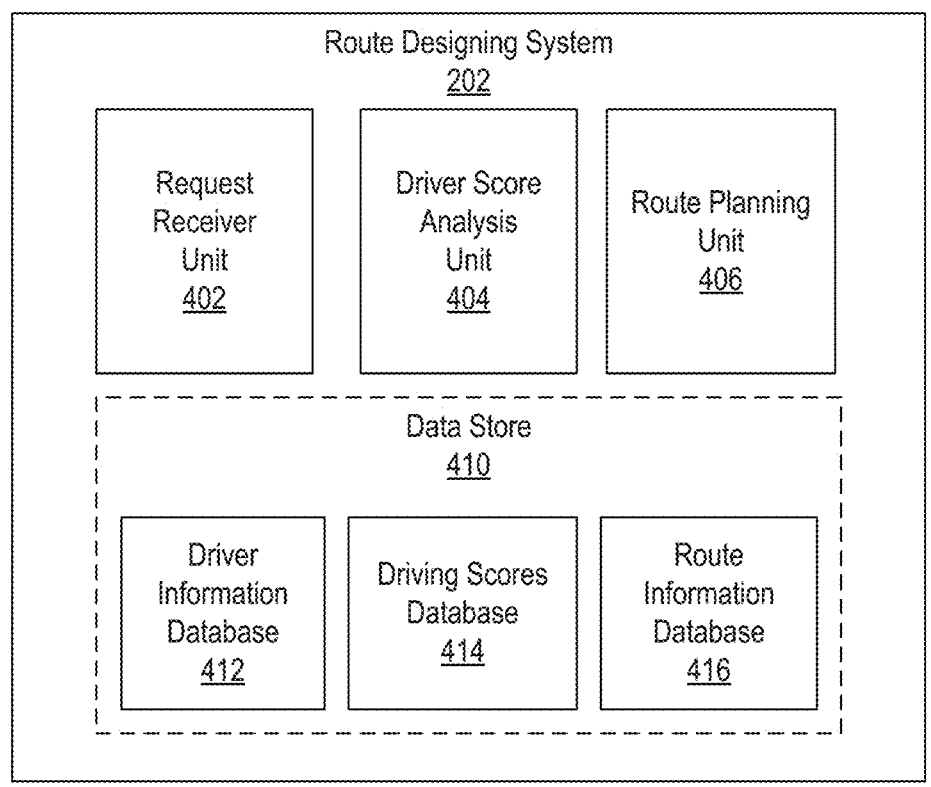
FIG. 4 is a block diagram of an example implementation of a route designing system according to one or more aspects of the disclosure.

FIG. 4 shows an example implementation of a route designing system 202. In some example implementations, the route designing system 202 is a special-purpose computing device programmed with instructions that, when executed, perform functions associated with vehicle telematics data (and/or driving scores) to determine preferred routes for drivers. In these example implementations, the units 402-416 of the route designing system 202 correspond to particular sets of instructions embodied as software programs residing at the route designing system 202. In other example implementations, the route designing system 202 is a collection of special-purpose computing devices that are interconnected and in signal communication with each other. In these examples, each unit 402-416 of the route designing system 202 respectively corresponds to a special-purpose computing device programmed with a particular set of instructions, that, when executed, perform respective functions associated with using vehicle telematics data (and/or driving scores) to determine preferred routes for drivers. Such special-purpose computing devices may be, for example, application servers programmed to perform the particular set of functions.

The route designing system 202, in this example, includes various units and databases that facilitate receiving requests for preferred routes for a vehicle from a first geographical point to a second geographical point, receiving driving scores associated with drivers of other vehicles, identifying preferred and non-preferred vehicles based on the driving scores, and designing preferred routes in which the vehicle maintains a threshold distance from at least some of the non-preferred vehicles. It will be appreciated that the route designing system 202 illustrated in FIG. 4 is shown by way of example and that other implementations of the route designing system 202 may include additional or alternative units and databases without departing from the scope of the claimed subject matter. In this example, the route designing system 202 includes a request receiver unit 402, a driver score analysis unit 404, a route planning unit 406, and a data store 410.

The data store 410 may store information related to drivers of vehicles requesting preferred routes, drivers of other vehicles, driver scores for drivers associated with other vehicles, and route information. For example, the data store 410 may include a driver information database 412, a driving scores database 414, and a route information database 416. The route designing system 202 may utilize this information in receiving requests for preferred routes, collecting driver scores from drivers of other vehicles, and determining preferred routes based on the driver scores. It will be appreciated that in other examples the data store 410 may include additional and/or alternative databases. For example, it may be advantageous to store/maintain driver information for drivers requesting preferred routes separately from drivers of other vehicles from which drivers scores are collected.

The driver information database 412 may store information associated with drivers of vehicles (e.g., name of driver, age of driver, contact information, vehicle identification, insurance information, etc.). In some examples, the driver information database 412 may also store the driver's affiliation with one or more insurance companies. Further, the driver information database 412 may store driver selected route preferences. For instance, in addition to safety, a driver may indicate a preference for shortest routes, scenic routes, fuel economy, etc. The route designing system 202 may take these preferences into account when designing a route for the driver. As such, the route designing system 202 may provide different preferred routes for different drivers, even where the drivers request routes between the same two geographical points at the same time of day, where the driver information database 412 indicates different route preferences for the drivers.

The driving scores database 414 may store information associated with driving scores associated with a driver of a vehicle. For example, the information may include the vehicle telematics data collected from the vehicle or other sources, and the driving score calculated based on the vehicle telematics data. As such, the driving scores database 414 may enable the route designing system 202 to maintain a driving score for a plurality of drivers. The driving scores database 414 may maintain, e.g., through a database relationship, an association between a driver in the driver information database 412, and the driving score associated with the driver. As described herein, the route designing system 202 may associate a driving score with a driver based at least on the vehicle telematics data received from a vehicle associated with the driver. In other examples, the route designing system 202 may directly receive a driving score from the vehicle associated with the driver or an alternate source.

The route information database 416 may store information associated with a traffic system. In some examples, a traffic system may be represented as mini-routes, where a mini-route may be segment of traffic system (e.g., one or more blocks). In such examples, for each mini-route, the route information database 416 may store corresponding information, such as coordinates, type of roadway (e.g., one-way street, two-way street, city street, highway, etc.), number of lanes, speed limit, etc. The route information database 416 may also capture statistics corresponding to a particular mini-route (e.g., by analyzing and aggregating vehicle operation data collected form the vehicles 206, from a third-party system, etc.), such as an average speed limit, an average distance between vehicles, peak traffic hour, etc. In some examples, a mini-route may be restricted to a drivers with insurance (or drivers associated with a particular insurance company), drivers with a threshold driving score, or vehicle classification (e.g., 2-axle passenger vehicles, 2-axle commercial vehicles, 3-4 axle vehicles, 5-9 axle vehicles, or other similar classifications). Further, the route information database 416 may maintain, e.g., through a database relationship, associations between the mini-routes, such that the route designing system 202 may determine how to construct a route from one geographical point to another geographical point using a plurality of mini-routes. For example, the traffic system may maintain that a first mini-route is associated with a second mini-route, where the two mini-routes represent contiguous segments of one roadway. As such, the starting point of the second mini-route may be the end point of the first mini-route.

It will be appreciated by those skilled in the art that additional or alternative models may be employed to represent a traffic system. For example, a traffic system may be represented as a graph having edges and nodes. The edges may represent a segment of a traffic system (e.g., one or more blocks), and the nodes may represent intersections (i.e., the points at which one or more edges may intersect). As such, the route information database 416 may store the edges, nodes, and corresponding information, such as coordinates, type of roadway (e.g., one-way street, two-way street, city street, highway, etc.), number of lanes, speed limit, etc. The route information database 416 may also capture statistics corresponding to a particular edge, as described above with respect to mini-routes.

Figure 5:
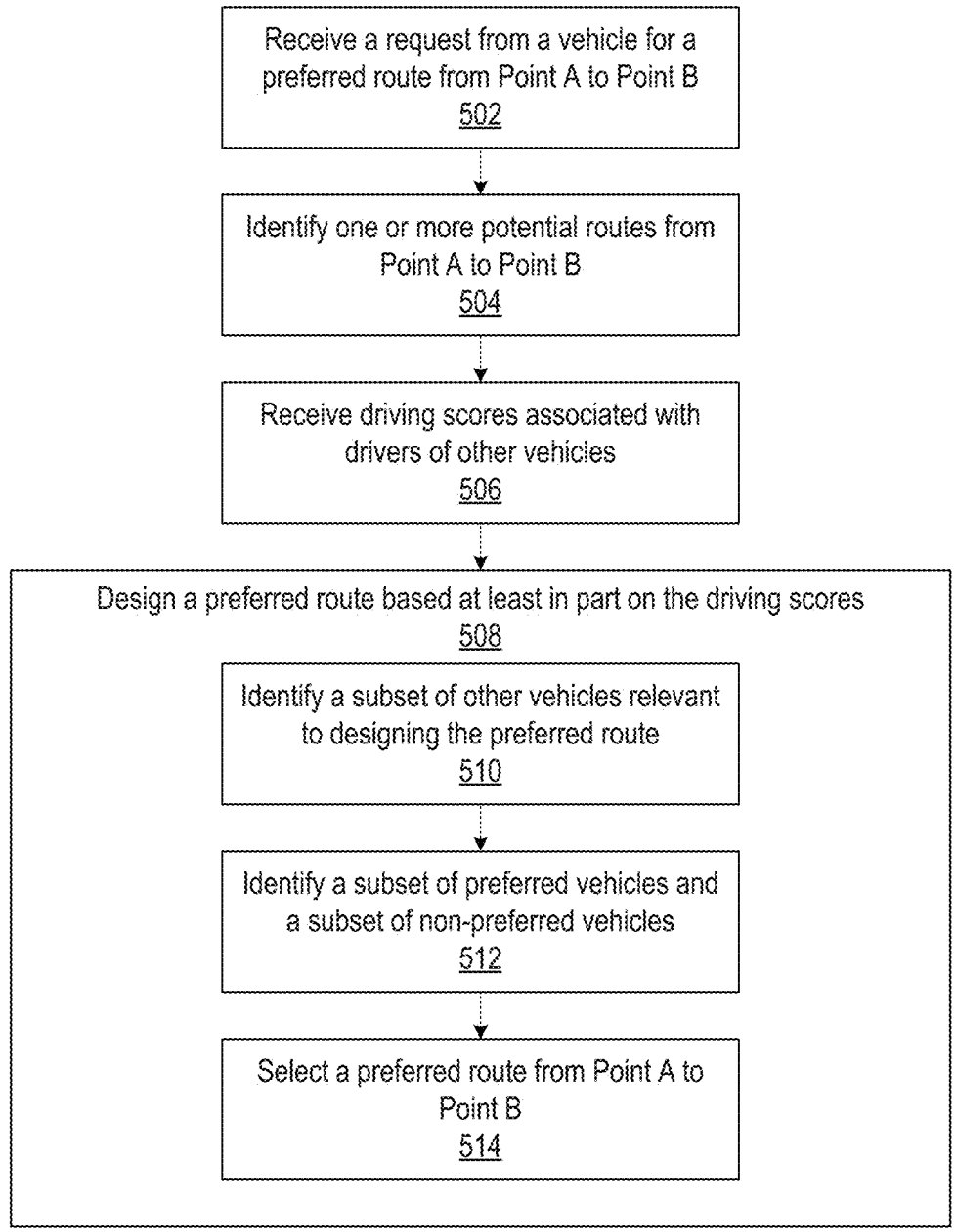
FIG. 5 is a flowchart of example method steps for designing a preferred route for a vehicle.

Referring now to FIG. 5, a flowchart 500 of example steps for designing a preferred route is shown. The various components of the route designing system 202 may be used to perform these method steps. The request receiver unit 402 may receive and analyze requests from a vehicle 204 for a preferred route from a first geographical point to a second geographical point (block 502). In some examples, the request may be for immediate travel. In other examples, the request may specify a future time of travel (e.g., <60 minutes after the current time, <12 hours after the current time, <7 days after the current time, etc.).

The request receiver unit 402 may analyze the request to identify a driver associated with the vehicle 204, and locate the geographical points specified in the requests. In some examples, the request receiver unit 402 may determine characteristics and preferences of the requesting driver from the driver information database 412. The request receiver unit 402 may also standardize the geographical points provided in the request. For instance, the driver of a vehicle 204 may provide geographical points as any of addresses, monuments/landmarks, longitude/latitude, etc. As such, the request receiver unit 402 may standardize all geographic points to be represented in a standard format (e.g., addresses, monuments/landmarks, longitude/latitude, etc.). In doing so, the request receiver unit 402 may be in signal communication with a third-party system (e.g., postal service system or other third-party address standardization systems). Alternatively, the request receiver unit 402 may standardize the geographical points based on the traffic system represented in the route information database 416. As such, the request receiver unit 402 may identify a starting point and an end point of a preferred route based on the traffic system represented in the route information database 416.

The request receiver unit 402 may provide the information included in and/or determined from the request to the driving score analysis unit 404. Based on the first geographical point and the second geographical point, the driver score analysis unit 404 may determine one or more potential routes from the first geographical point to the second geographical point (block 504). Each of the potential routes may consist of one or more contiguous segments of a traffic system (e.g., contiguous mini-routes, contiguous edges, etc.). Segments of a traffic system may be contiguous where the end point of a first segment overlaps with or is adjacent to the starting point of a second segment. Each of the potential routes may begin with a segment including (e.g., starting with) the first geographical point, and may end with a segment including (e.g., ending with) the second geographical point.

In some examples, the driving score analysis unit 404 may identify all or almost all of the potential routes from the first geographical point to the second geographical point. In such examples, the driving score analysis unit 404 may consider a limited set of factors (e.g., avoid loops, avoid routes with construction, etc.) in order to identify as many routes as possible. For instance, the driving score analysis unit 404 may choose to ignore a particular set of inefficiencies (e.g., travel time, gas consumption, speed limits, traffic congestion, etc.) when determining the potential routes. As such, at least some of the potential routes identified by the driving analysis unit 404 in this step may be sub-optimal for the vehicle 204.

In other examples, the driving score analysis unit 404 may identify a subset of all the potential routes from the first geographical point to the second geographical point. For instance, the subset may be the top (e.g., top five, etc.) routes based on the estimated time of arrival. In another example, the subset may be one route including highways, one route not including highways, and one route not including tolls. In yet other examples, the driving score analysis unit 404 may identify a subset of all the potential routes based on the desirability of the mini-routes comprising the potential routes. A desirability level of a mini-route may be calculated based on traffic data, weather data, hazard data, and other contextual information received from third-party systems. In these examples, the driving score analysis unit 404 may identify the top routes based on the desirability levels of the mini-routes comprising the potential routes. Alternatively, the driving score analysis unit 404 may be configured to have a desirability threshold, where the threshold may be a total desirability level of the mini-routes of a potential route, an average desirability level of the mini-routes of a potential route, etc. Based on this threshold, the driving score analysis unit 404 may identify a subset of potential routes that meet or exceed the desirability threshold.

In at least some embodiments, the driving score analysis unit 404 may receive driving scores associated with drivers of other vehicles 206 (block 506). In alternate embodiments, the driving score analysis unit 404 my receive vehicle telematics data associated with the other vehicles 206, where the driving score analysis unit 404 may calculate driving scores associated with drivers of the other vehicles 206 based on the vehicle telematics data, as described above. The driving score analysis unit 404 may also receive other information from the other vehicles 206, such as a current location, a velocity (i.e., a speed and direction of travel), and other relevant information about the movement of the vehicles 206.

The driving score analysis unit 404 may provide the driving scores associated with drivers of other vehicles 206 and other movement-related information to the route planning unit 406. Based, at least in part, on the information received from the other vehicles 206, the route planning unit 406 may design a preferred route for the vehicle 204 (block 508).

The route planning unit 406 may identify a subset of the other vehicles 206 which will be relevant in designing a preferred route for vehicle 204 (block 510). In at least some embodiments, the route planning unit 406 may use the current locations of the other vehicles 206 to identify a subset of vehicles 206 that are currently on or within a threshold radius (e.g., 25 feet, 50 feet, 100 feet, 1 mile, etc.) away from at least one of the segments of a potential route for the vehicle 204. Additionally, the route planning unit 406 may use the current locations and other movement-related information of the other vehicles 206 to identify a subset of vehicles 206 that are likely to be on or within a threshold radius away from at least one of the segments of a potential route for the vehicle 204. Further, the route planning unit 406 may associate each of the other vehicles 206 in the subset with the one or more segments of a potential route. As such, the route planning unit 406 may associate each of the other vehicles 206 in the subset with one or more potential routes.

In some examples, to identify vehicles 206 that are currently on one of the segments, the route planning unit 406 may compare the current locations (e.g., coordinates, etc.) of the vehicles 206 with the coordinates of the segments. As such, vehicles 206 with coordinates overlapping coordinates of a segment of a potential route may be considered on one of the segments. In another example, to identify vehicles 206 that are likely to be on one of the segments simultaneously with the vehicle 204, the route planning unit 406 may calculate future locations (e.g., coordinates, etc.) of the vehicles based on the movement-related information. For instance, the future locations may be calculated based on the travel time specified in the request for a preferred route by the vehicle 204. In particular, the route planning unit 406 may use the current location of a vehicle 206 in combination with the velocity of the vehicle 206 to determine its coordinates beginning at the travel time specified in the request and ending at the estimated arrival time for a particular potential route.

In further examples, the movement-related information gathered from the vehicles 206 may include route information for the other vehicles 206. In such examples, the route planning unit 406 may use this information to determine whether any of the other vehicles 206 are either in or likely to be in a potential route for vehicle 204. For instance, the route planning unit 406 may superimpose the potential routes for 204 onto the route information for each of the vehicles 206 to determine any overlaps. In some examples, the route planning unit 406 may determine that there is an overlap where a coordinate included in the route information for vehicle 206 is also included in a potential route for vehicle 204. Alternatively, the route planning unit 406 may determine that there is an overlap where a segment included in the route information for vehicle 206 is also included in a potential route for vehicle 204. In some examples, where the route planning unit 406 may further determine whether the identified overlap (e.g., coordinate, segment, etc.) occurs at a same or similar (e.g., within a particular threshold of time) to the travel time specified in the request for a preferred route from vehicle 204. As such, a route planning unit 406 may or may not consider a vehicle 206 to be overlapping where the vehicles 204 and 206 are likely to be in the same coordinate or segment at different times (e.g., beyond a particular threshold of time).

The route planning unit 406 may identify a set of preferred vehicles and a set of non-preferred vehicles from the subset of vehicles identified in block 510 (block 512). The route planning unit 406 may determine the set of preferred vehicles based on the driving scores. For instance, the set of preferred vehicles may include the other vehicles 206 associated with drivers having driving scores at or above a threshold value. The route designing system 202 may configure a standard threshold value (i.e., the threshold would be the same for all users of the route designing system 202). Alternatively, in some examples, the threshold value may be defined by the driving scores of the vehicles in the subset of vehicles (e.g., top x %, above the average driving score, etc.). In other examples, the threshold value may be based on the driving score of the driver of the vehicle 204 (e.g., within 10% of the driver's driving score, at or above the driver's driving score, etc.). Similarly, the route planning unit 406 may determine a set of non-preferred vehicles based on the driving scores. For example, the set of non-preferred vehicles may include the other vehicles associated with drivers having driving scores below a threshold value. The threshold value for non-preferred may be configured inversely to the threshold value for preferred vehicles. For example, where the threshold value for preferred vehicles is the top 10%, the threshold value for non-preferred values may be configured as the bottom 90%.

The route planning unit 406 may then select a preferred route from the set of potential routes based in part on considerations of driver safety (block 514). For example, the route planning unit 406 may evaluate each of the potential routes based on the set of preferred vehicles and the set of non-preferred vehicles. In particular, the route planning unit 406 may select a preferred route by maximizing the likelihood of proximity the set of preferred vehicles and minimizing the likelihood of proximity to the set of non-preferred vehicles. As described in further detail below, the route planning unit 406 may measure the likelihood of proximity by analyzing the number of preferred and non-preferred vehicles along a potential route, by analyzing the distances between the preferred and non-preferred vehicles and the vehicle 204, or by weighting the plurality of segments of a potential route with the driving scores of the preferred and non-preferred vehicles along a potential route. As used in this description, a vehicle may be along a potential route where its location (e.g., coordinates) is included in one of the segments of a potential route or within a radius (e.g., 25 feet, 50 feet, 100 feet, 1 mile, etc.) of the segments of a potential route. In some examples, in minimizing the likelihood of proximity to the set of preferred vehicles, the route designing system 202 may ensure that the vehicle 204 maintains at least a threshold distance (e.g., a 25-foot radius, 50-foot radius, 100-foot radius, 1-mile radius, etc.) from some or all of the non-preferred vehicles.

In at least one embodiment, the route planning unit 406 may determine the number of preferred vehicles and the number of non-preferred vehicles associated with each potential route. As described above, each of the other vehicles 206 that is found to be relevant to designing a preferred route for the vehicle 204 may be associated with one or more segments of one or more potential routes. In some examples, based on these associations, the route planning unit 406 may determine a number of preferred vehicles and a number of non-preferred vehicles associated with a potential route. As such, for each segment of a potential route, the route designing unit 406 may determine the number of preferred vehicles and the number of non-preferred vehicles associated with the segment. The route designing unit 406 may aggregate these values to obtain the number of preferred vehicles associated with the potential route.

In some examples, the route designing unit 406 may select a preferred route based on the aggregate number of preferred vehicles and the aggregate number of non-preferred vehicles associated with the preferred route to maximize driver safety. For example, the route designing unit 406 may select the route associated with the maximum number of preferred vehicles, without regard to the number of non-preferred vehicles. In another example, the route designing unit 406 may select the route associated with the minimum number of non-preferred vehicles, without regard to the number of preferred vehicles. In yet another example, the route designing unit 406 may calculate a preferred vehicle differential for each potential route. As such, the route designing unit 406 may subtract the number of non-preferred vehicles associated with a potential route from the number of preferred vehicles associated with the potential route to obtain a preferred vehicle differential for the potential route (e.g., Preferred Vehicle Differential=Number of Preferred Vehicles−Number of Non-Preferred Vehicles). In such examples, the route designing unit 406 may select the route with the maximum preferred vehicle differential. In a further example, the route designing system 406 may select the route by comparing the number of preferred vehicles to a threshold number of preferred vehicles and/or comparing the number of non-preferred vehicles to a threshold number of non-preferred vehicles. As such, the route designing unit 406 may be configured to select the route where the number of preferred vehicles is equal to or greater than the threshold number of preferred vehicles, the number of non-preferred vehicles is equal to or less than the threshold number of non-preferred vehicles, or a combination thereof. Where no such routes are available, the route designing unit 406 may select a route based on one or more of the other methods described herein. It will be appreciated by those skilled in the art that other methods of selecting a preferred route based on the number of preferred vehicles and the number of non-preferred vehicles may be implemented by the route designing unit 406.

The following table reflects an example of the calculation, where there are 5 potential routes for the vehicle 204.

| Potential Route | Number of Preferred Vehicles | Number of Non-Preferred Vehicles |
| --- | --- | --- |
| Route #1 | 6 | 3 |
| Route #2 | 0 | 6 |
| Route #3 | 5 | 5 |
| Route #4 | 2 | 4 |
| Route #5 | 2 | 0 |

Where the route designing unit 406 selects the route associated with the maximum number of preferred vehicles, the route designing unit 406 in this example would select Route #1. Where the route designing unit 406 selects the route associated with the minimum number of preferred vehicles, the route designing unit 406 in this example would select Route #5. Where the route designing unit 406 selects the route with the maximum preferred vehicle differential, the route designing unit 406 in this example would select Route #1.

In another embodiment, the route designing unit 406 may select a preferred route by comparing the locations of the preferred vehicles to the locations (e.g., current location, future locations along the potential route) of the vehicle 204 and/or comparing the locations of the non-preferred vehicles to the locations of the vehicle 204. As such, the route designing unit may calculate a distance between each of the preferred vehicles and the vehicle 204 along the route, and a distance between each of the non-preferred vehicles and the vehicle 204 along the route. The route designing unit 406 may then aggregate these distances. For instance, the route designing unit 406 may compute a set of metrics based on the distances, such as a total distance from the preferred vehicles, a total distance from the non-preferred vehicles, the average distance from the preferred vehicles, the average distance from the non-preferred vehicles, etc.

In some examples, the route designing unit 406 may select a preferred route based on the aggregate distance of the vehicle 204 from the preferred and non-preferred vehicles. For example, the route designing unit 406 may select the route with the lowest total distance or lowest average distance from the preferred vehicles, without regard to the total distance or average distance from the non-preferred vehicles. In another example, the route designing unit 406 may select the route with the highest total distance or highest average distance from the non-preferred vehicles, without regard to the total distance or average distance from the preferred vehicles. In yet another example, the route designing system 406 may select the route by comparing the distance from each preferred vehicle to a threshold preferred distance (e.g., a 25-foot radius, 50-foot radius, 100-foot radius, 1-mile radius, etc.) and/or comparing the distance from each non-preferred vehicle to a threshold non-preferred distance (e.g., a 25-foot radius, 50-foot radius, 100-foot radius, 1-mile radius, etc.). The threshold preferred distance and the threshold non-preferred distance may be configured to be the same or different. In such examples, the route designing system 406 may determine a number of preferred vehicles that are at or below the threshold preferred distance and/or may determine a number of non-preferred vehicles that are at or below the threshold non-preferred distance. As such, the route designing unit 406 may be configured to select the route with the maximum number of preferred vehicles at or below the preferred distance, the minimum number of non-preferred vehicles at or below the non-preferred distance, the maximum preferred distance differential (i.e. Preferred Vehicle Differential=Number of Preferred Vehicles at or below the preferred distance=Number of Non-preferred Vehicles at or below the non-preferred distance). It will be appreciated by those skilled in the art that other methods of selecting a preferred route based on the distances between the preferred vehicles, the non-preferred vehicles, and the vehicle 204 may be implemented by the route designing unit 406.

In yet another embodiment, the route designing unit 406 may select a preferred route by weighting the segments of each potential route by the driving scores associated with the preferred and non-preferred vehicles. In some examples, the route designing unit 406 may aggregate the driving scores associated with the preferred and non-preferred vehicles associated with a particular segment of a potential route. The route designing module 406 may then aggregate the aggregated driving scores from each segment to obtain an aggregated driving score for the potential route. Since a preferred vehicle will be associated with a higher driving score than a non-preferred vehicle, the route designing unit 406 may select the route with the highest aggregate driving score. Thus, the route designing unit 406 may enhance driving safety (e.g., by increasing likelihood of proximity to preferred vehicles) by selecting routes associated with higher aggregate driving scores.

In some embodiments, the route planning unit 406 may use additional considerations to select a preferred route. For instance, the route planning unit 406 may select a preferred route based in part on reduction of travel time, reduction of gas usage, avoidance of traffic congestion, any other driver-specified preferences, or a combination thereof. For instance, the route planning unit 406 may use these additional considerations where two potential routes are equivalent based on the driving safety consideration alone. For example, where two potential routes for a vehicle 204 have a maximum preferred vehicle differential of 10, the route designing unit 406 may consider additional considerations to select one of the two potential routes as the preferred route.

In other embodiments, the driver of the vehicle 204 provide the route designing system 406 (and/or the route designing system 202 at large) with a hierarchy of considerations to apply when selecting a preferred route. In some examples, the driver may provide such a hierarchy for a one-time use (i.e., to be used only for one particular trip), or as driving preferences. The route designing system 202 may store the driving preferences in the driver information database 412. In some instances, the driver of a vehicle 204 may provide the hierarchy of consideration through the route designing unit 208 or an interface on a special-purpose mobile computing device 210, such as a route designing mobile application and the like.

Once a preferred route has been selected, the route designing system 202 may provide the preferred route to the vehicle 204 (or to the driver of the vehicle 204) through the route designing unit 208 (e.g., via an on-board vehicle computing device) or through the special-purpose mobile computing device 210. The preferred route may be communicated to the vehicle 204 (or to the driver of the vehicle 204) through software instructions, textual instructions, audio instructions, graphical instructions, or a combination thereof.

In some embodiments, the route designing system 202 may update the preferred route while the vehicle 204 is progressing along the currently-prescribed preferred route. As such, the route designing system 202 may repeat steps 506 through 514 until the vehicle 204 arrives at Point B. In some examples, the route designing system 202 may repeat steps 506 through 514 at regular intervals (e.g., every 30 seconds, every 1 minute, every 10 minutes, etc.).

In other examples, the route designing system 202 may repeat step 506 at regular intervals (e.g., every 30 seconds, every 1 minute, every 10 minutes, etc.) to determine whether any new or updated information related to the other vehicles 206 is available. For instance, the route designing system 202 may receive an updated location or route for one of the other vehicles 206 which makes the vehicle relevant to designing a preferred route for a vehicle. In particular, one of the other vehicles 206 may have recently changed its route or direction, thereby increasing its likelihood of proximity to the vehicle 204. In another instance, the route designing system 202 may receive an updated driving score for one of the other vehicles 206. One of the other vehicles 206 may have engaged in a driving behavior that causes an increase or decrease in its driving score.

In such examples where new or updated information related to at least one of the other vehicles 206 is available, the route designing system 202 may execute steps 508 through 514 to determine whether the preferred route needs to be updated, due to, e.g., a change in at least one of the vehicles' 206 designation as a preferred or non-preferred vehicle, a change in the distance between the vehicle 204 and the other vehicles 206, or a change in at least one of the vehicles' 206 driving scores. As such, in some examples, the route designing system 202 may update the preferred route only where relevant data has been changed since the initial route design, thereby advantageously conserving the computing resources of the route designing system 202.

Additionally or alternatively, in some embodiments, the route designing system 202 may provide alerts to the driver of the vehicle 204. The alerts may include instructions pertaining to the preferred route, or updates to the preferred route, as described above. The route designing system 202 may provide alerts to the vehicle 204 (or to the driver of the vehicle 204) through the route designing unit 208 or through the special-purpose mobile computing device 210. The alerts may be communicated to the vehicle 204 (or to the driver of the vehicle 204) through software instructions, textual instructions, audio instructions, graphical instructions, or a combination thereof.

In some examples, the route designing system 202 may provide alerts to the driver of the vehicle 204 where the preferred route cannot be updated in time. For instance, while repeating step 506 of FIG. 5, the route designing system 202 may receive new or updated information related to one of the other vehicles 206 (e.g., a non-preferred vehicle). For example, a non-preferred vehicle may be in extremely close proximity to the vehicle 204 (e.g., within a 10-foot radius, within a 25-foot radius, within 50-foot radius, etc.). Alternatively, a non-preferred vehicle may be exhibiting rogue, unexpected, or otherwise unsafe driving behaviors. As such, instead of suddenly updating the preferred route and giving the driver of the vehicle 204 limited time to react to the update (and the resulting instructions), the route designing system 202 may choose to provide an alert to the driver of the vehicle 204. In such examples, the alert may supersede some of all of the instructions provided on the basis of the preferred route. Providing such alerts may advantageously bring the updated route information to the attention of the driver of the vehicle 204, without instructing the driver of the vehicle to engage in unsafe driving behaviors in order to avoid a non-preferred vehicle. In such examples, unsafe driving behaviors may include sudden/sharp turns, hard braking, sudden acceleration, and the like.

Figure 6:
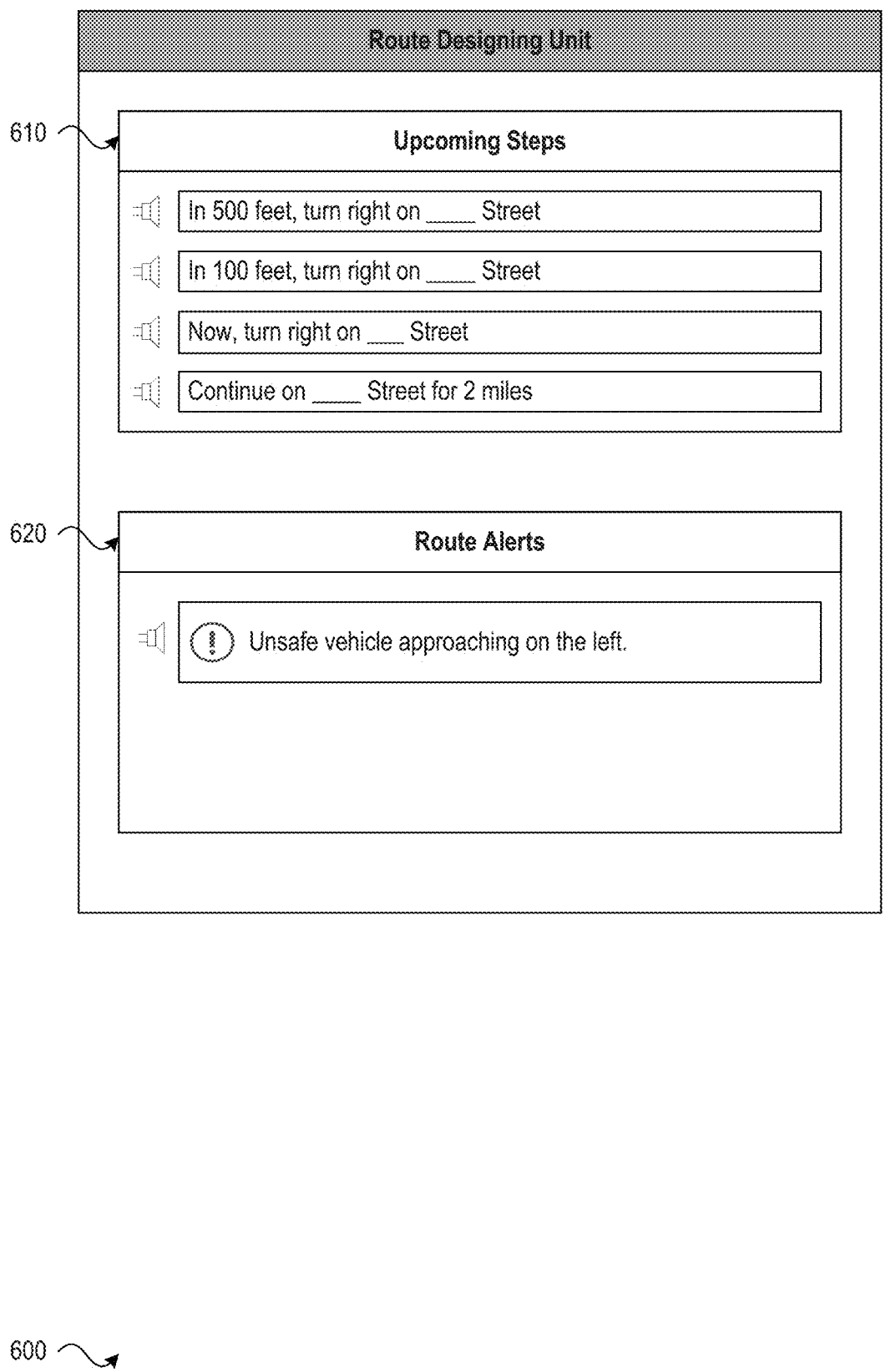
FIG. 6 is an example user interface of a route designing system configured to provide alerts according to one or more aspects of the disclosure.

FIG. 6 is an example user interface 600 which may be configured to provide alerts to the driver of the vehicle 204, as described above. The user interface 600 may be displayed an on-board vehicle computing device or via a special-purpose mobile computing device 210. In particular, a first component 610 of the user interface 600 may be configured to display textual and graphical instructions pertaining to the upcoming steps of the preferred route. As the route designing system 202 updates the preferred route, the steps shown in the first component 610 may be updated accordingly. Further, a second component 620 of the user interface 600 may be configured to display alerts pertaining to unsafe (i.e. non-preferred) vehicles. In some examples, the second component 620 may indicate a level of severity of the alert (e.g., low risk, medium risk, high risk, etc.). The level of severity may be based, at least in part, on the proximity of the non-preferred vehicle to the vehicle 204, the driving score of the non-preferred vehicle, or a combination thereof. In some embodiments, the textual instructions shown in the user interface 600 may be accompanied by audio instructions.

While the disclosure has been described with respect to specific examples including presently illustrative modes of carrying out this disclosure, a person having ordinary skill in the art, after review of the entirety disclosed herein, will appreciate that there are numerous variations and permutations of the above-described systems and techniques that fall within the spirit and scope of the disclosure.

What is claimed is:

1. A networked system comprising:
   a route designing system comprising at least one processor and a memory storing at least a score analysis unit and a route planning unit, that when executed by the at least one processor, cause the route designing system to:
   determine, by the at least one processor, driving scores associated with each of a plurality of vehicles, wherein the plurality of vehicles does not include a first vehicle;
   associate, by the at least one processor, the plurality of vehicles with one of a set of preferred vehicles and a set of non-preferred vehicles based, at least in part, on the driving scores associated with each of the plurality of vehicles;
   associate, by the at least one processor, vehicles in the set of preferred vehicles and vehicles in the set of non-preferred vehicles with a plurality of potential routes;
   identify, by the at least one processor, a plurality of potential routes from a first geographical point to a second geographical point for the first vehicle; and
   determine, by the at least one processor, a preferred route from the plurality of potential routes, wherein the preferred route is designed to at least one of: maximize a likelihood of proximity to the vehicles in the set of preferred vehicles and minimize the likelihood of proximity to the vehicles in the set of non-preferred vehicles; and
   a route designing unit located in the first vehicle communicatively coupled to the route designing system, comprising a first processor and a first memory storing computer-readable instructions, that when executed by the first processor, cause the route designing unit to:
   output the preferred route, determined by the route designing system, to a user interface device located in the first vehicle, wherein the user interface device is configured to visually display textual information and to output alerts.

2. The networked system of claim 1 wherein the route planning unit, when executed by the at least one processor, further causes the route designing system to:
   determine a preferred route based, at least in part, on a comparison of an aggregate number of preferred vehicles and an aggregate number of non-preferred vehicles for each of the potential routes in the plurality of potential routes, wherein the aggregate number of preferred vehicles is a number of vehicles in the set of preferred vehicles associated with a potential route, and wherein the aggregate number of non-preferred vehicles is a number of vehicles in the set of non-preferred vehicles associated with the potential route.

3. The networked system of claim 2 wherein the route planning unit is configured to identify the preferred route as the potential route with the highest aggregate number of preferred vehicles of the plurality of potential routes.

4. The networked system of claim 2 wherein the route planning unit is configured to identify the preferred route as the potential route with the fewest aggregate number of non-preferred vehicles of the plurality of potential routes.

5. The networked system of claim 2 wherein the route planning unit is configured to identify the preferred route as the potential route with the greatest difference between the aggregate number of preferred vehicles and the aggregate number of non-preferred vehicles of the plurality of potential routes.

6. The networked system of claim 1 wherein the route planning unit, when executed by the at least one processor, further cause the route designing system to:
   determine a preferred route based, at least in part, on a comparison of an aggregate distance to preferred vehicles and an aggregate distance to non-preferred vehicles for each of the potential routes in the plurality of potential routes, wherein the aggregate distance to preferred vehicles is a cumulative distance between the first vehicle and each of the vehicles in the set of preferred vehicles, and wherein the aggregate distance to non-preferred vehicles is a cumulative distance between the first vehicle and each of the vehicles in the non-preferred vehicles.

7. The networked system of claim 1 wherein the route planning unit, when executed by the at least one processor, further cause the route designing system to:
   determine a preferred route based, at least in part, on a comparison of an aggregate driving score for each of the potential routes in the plurality of potential routes, wherein the aggregate driving score is cumulative of the driving scores of the vehicles in the set of preferred vehicles and the vehicles in the set of non-preferred vehicles associated with a potential route.

8. The networked system of claim 1 wherein the instructions, when executed by the at least one processor, further cause the route designing unit to:
   transmit an alert to a driver associated with the first vehicle, wherein the alert includes information pertaining to the preferred route.

9. The networked system of claim 1 wherein the score analysis unit, when executed by the at least one processor, further causes the route designing system to:
   determine updated driving scores associated with each of the plurality of vehicles; and wherein the route designing unit is configured to transmit an alert to a driver associated with the first vehicle, wherein the alert includes information pertaining to the updated driving scores.

10. The networked system of claim 1 wherein the score analysis unit and the route planning unit, when executed by the at least one processor, further cause the route designing system to:
   determine updated driving scores associated with each of the plurality of vehicles; and
   modify the preferred route based, at least in part, on updated driving scores associated with each of the plurality of vehicles.

11. A method of designing a preferred route comprising:
   determining, by a processor, a plurality of potential routes from a first geographical point to a second geographical point for a first vehicle;
   retrieving, by the processor, driving scores associated with each of a plurality of vehicles, wherein the plurality of vehicles are associated with the plurality of potential routes;
   associate, by the processor, the plurality of vehicles with one of a set of preferred vehicles and a set of non-preferred vehicles based, at least in part, on the driving scores associated with each of the plurality of vehicles;
   determining, by the processor, a preferred route from the plurality of potential routes, wherein the preferred route is designed to maximize a likelihood of proximity to the vehicles in the set of preferred vehicles; and
   outputting the preferred route to a user interface device located in the first vehicle, wherein the user interface device is configured to visually display textual information and to output alerts.

12. The method of claim 11 further comprising:
   determining a preferred route based, at least in part, on a comparison of an aggregate number of preferred vehicles and an aggregate number of non-preferred vehicles for each of the potential routes in the plurality of potential routes, wherein the aggregate number of preferred vehicles is a number of vehicles in the set of preferred vehicles associated with a potential route, and wherein the aggregate number of non-preferred vehicles is a number of vehicles in the set of non-preferred vehicles associated with the potential route.

13. The method of claim 12 wherein the preferred route is the potential route with the greatest difference between the aggregate number of preferred vehicles and the aggregate number of non-preferred vehicles of the plurality of potential routes.

14. The method of claim 11 further comprising:
   determining a preferred route based, at least in part, on a comparison of an aggregate distance to preferred vehicles and an aggregate distance to non-preferred vehicles for each of the potential routes in the plurality of potential routes, wherein the aggregate distance to preferred vehicles is a cumulative distance between the first vehicle and each of the vehicles in the set of preferred vehicles, and wherein the aggregate distance to non-preferred vehicles is a cumulative distance between the first vehicle and each of the vehicles in the set of non-preferred vehicles.

15. The method of claim 14 wherein the preferred route is designed to maintain at least a threshold non-preferred distance between the first vehicle and at least some of the vehicles in the set of non-preferred vehicles.

16. The method of claim 11 further comprising:
   determining a preferred route based, at least in part, on a comparison of an aggregate driving score for each of the potential routes in the plurality of potential routes, wherein the aggregate driving score is cumulative of the driving scores of the vehicles in the set of preferred vehicles and the vehicles in the set of non-preferred vehicles associated with a potential route.

17. The method of claim 11 further comprising:
   transmitting an alert to a driver associated with the first vehicle, wherein the alert includes information pertaining to the preferred route.

18. The method of claim 11 further comprising:
   determining updated driving scores associated with each of the plurality of vehicles; and
   transmitting an alert to a driver associated with the first vehicle, wherein the alert includes information pertaining to the updated driving scores.

19. The method of claim 11 further comprising:
- determine updated driving scores associated with each of the plurality of vehicles; and
- modify the preferred route based, at least in part, on updated driving scores associated with each of the plurality of vehicles.

20. A tangible computer-readable memory storing computer-executable instructions that, when executed by at least one processor, cause a networked system of devices to perform a method comprising:
- determining, by the at least one processor, a plurality of potential routes from a first geographical point to a second geographical point for a first vehicle;
- retrieving, by the at least one processor, driving scores associated with each of a plurality of vehicles, wherein the plurality of vehicles are associated with the plurality of potential routes;
- associate, by the at least one processor, the plurality of vehicles with one of a set of preferred vehicles and a set of non-preferred vehicles based, at least in part, on the driving scores associated with each of the plurality of vehicles;
- determining, by the at least one processor, a preferred route from the plurality of potential routes, wherein the preferred route is designed to minimize the likelihood of proximity to the vehicles in the set of non-preferred vehicles; and
- outputting the preferred route to a user interface device located in the first vehicle, wherein the user interface is configured to visually display textual information and to output alerts.

* * * * *